Figure 1:
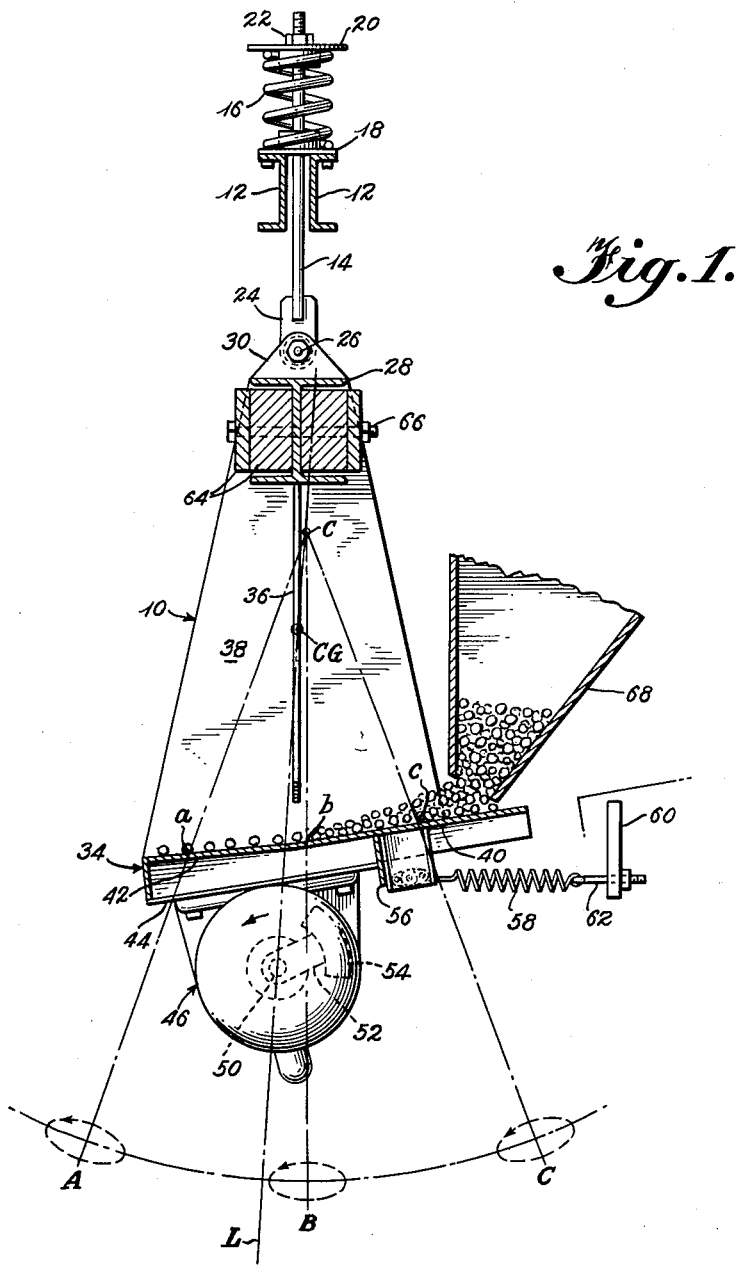

3,029,924
VIBRATING FEEDER
Albert Musschoot, Park Ridge, Ill., assignor to Link-
Belt Company, a corporation of Illinois
Filed Jan. 24, 1958, Ser. No. 711,008
11 Claims. (Cl. 198—59)

This invention relates to mechanical vibrating feeders and has as a primary object the provision of a materials feeder assembly for receiving particulate solid material by gravity feed from a hopper or other source and discharging the material in a single layer at a uniform velocity.

Another object of my invention is to provide a materials feeder for conveying aggregate material wherein the conveying action of the feeder is utilized to transform piled particulate solid material at the receiving end of the feeder into a single layer of material at the discharge end of the feeder.

Still another object of my invention is to provide a mechanical vibrating materials feeder especially designed to convey particulate solid material with a minimum of bouncing and rolling action imparted to the material being conveyed.

Other objects and advantages of my invention will become apparent by reference to the following specification taken in conjunction with the accompanying drawings.

Figure 2:
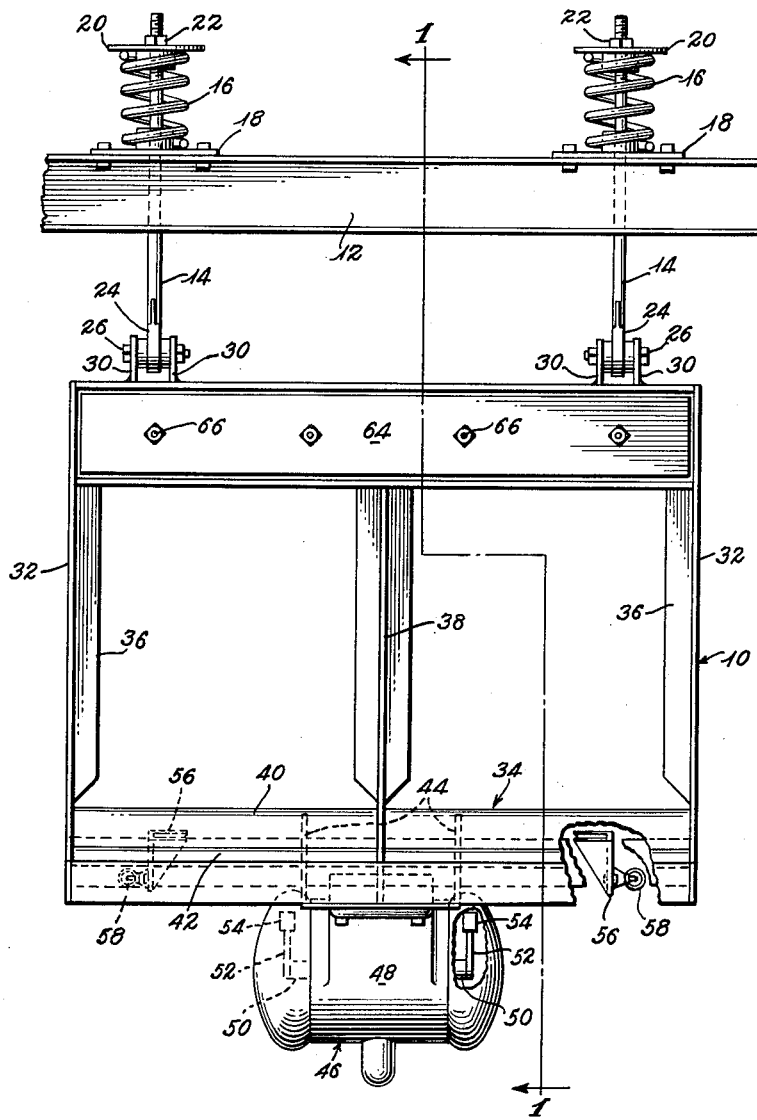

In the drawings:

FIGURE 1 is a longitudinal cross-sectional view of a vibrating feeder embodying the invention, taken on the line 1—1 of FIG. 2; and FIGURE 2 is an end view of the feeder shown in FIG. 1, with certain parts broken away to show details of the structure.

As shown in the drawings, a materials feeding trough assembly 10 is suspended from a fixed support which takes the form of a pair of channel shaped members 12 located in spaced back-to-back relationship as best seen in FIG. 1. The suspension or coupling includes a rod member 14 which passes upwardly between the channel members 12 and through the coils of a spring 16 which is supported upon a plate 18 fixedly secured to the upper surfaces of the channel members 12. A supporting plate 20 is seated upon the upper end of spring 16 and the rod 14 is in turn supported from the plate 20 by a nut 22 engaged with the threaded upper end of the rod 14. The nut 22 provides a means for vertically adjusting the rod 14 with respect to the fixed frame members 12. As best seen in FIG. 2, two identical suspension assemblies are employed, one adjacent each side of the assembly. The springs 16 not only support the rods 14 for vertical movement relative to the frame members 12, but also serve as vibration isolaters to prevent vibratory movement of the rods 14 in a vertical direction from being transmitted to the frame members 12.

At their lower ends, the rods 14 are provided with enlarged lugs 24, each of which is bored to receive a pivot pin 26 from which the feeder assembly is pivotally coupled to the rods 14. The upper cross frame member 28 of the assembly 10 takes the form of a horizontally extending I-beam having four transversely spaced lugs 30 welded to its upper surface. The lugs 30 are bored to receive the pivot pins 26, thereby coupling the assembly 10 to the rods 14 for pivotal movement about a horizontal axis which is movable with the rods 14.

Two side plate members 32 are secured, one at each end, to the frame member 28 to rigidly suspend the material supporting surface or deck 34 from the frame member 28. The side plates 32 are preferably provided with vertically extending stiffening members 36 which are secured, as by welding, to the side plates. As best appreciated from FIG. 1, the stiffeners 36 terminate at a level somewhat above the deck assembly 34 in order not to interfere with the flow of material across the deck 34. In cases where the width of the deck assembly 34 requires additional stiffening, intermediate vertical frame members such as 38 may be provided at selected locations.

As best seen in FIG. 1, the materials feeding surface of the deck assembly 34 is inclined downwardly toward its discharge end. While the downward slope of the deck is continuous, the surface of the deck may be said to be divided into a materials receiving portion 40 and a materials discharge portion 42 with the materials receiving portion 40 being inclined downwardly at a steeper angle than the materials discharge portion 42.

The lower surface of the deck assembly 34 is provided with a rigidly secured motor mount frame 44 upon which is secured a motorized mechanical vibrating unit 46 of the rotating counterweight type. The unit 46 includes an electrically powered motor which is enclosed in the central portion 48 of the unit. The motor drive shaft 50 is oriented to rotate about an axis parallel to the horizontal axis defined by the pivot pins 26 and is extended from the motor at either end as best seen in FIG. 2. At each end of the shaft 50, a radially extending crank 52 is fixedly mounted for rotation with the shaft 50. The cranks 52 are angularly aligned with each other and, at their outer ends, each is provided with a counterweight 54. It is believed apparent that rotation of the motor shaft will drive the eccentrically located mass assembly defined by the counterweights 54 and thereby impart a vibratory driving force to the feeder assembly 10.

In order to adjust the inclination of the deck assembly 34 for the optimum feeding characteristics, a pair of depending lug assemblies 56 are welded to the deck assembly. Tension springs 58 are coupled to the lug assemblies 56 at one end and adjustably secured at their other ends to a fixed frame member 60 by means of a nut and bolt assembly 62. It is believed apparent that by threading the nuts of the assemblies 62 further onto the bolts, the entire feeding assembly 10 may be pivoted in a counterclockwise direction about the pins 26 to increase the general inclination of the deck assembly 34 with respect to the horizontal.

The dynamic characteristics of the feeder may be varied by securing weights 64 to the cross frame member 28 as by bolts 66. Increasing or decreasing the mass of weights 64 changes the center of gravity of the feeder 10 and alters or adjusts the conveying characteristics of the feeder.

In FIG. 1 the feeder is shown in one particular environment wherein it feeds gravel aggregate received from a hopper 68. As best seen in FIG. 1, the bottom opening of the hopper 68 is so arranged as to discharge the aggregate material in a pile which may be several layers deep at the receiving end of the feeder. Because of the varying sizes of the individual stones, it is not possible to provide a hopper which will feed the stones onto the feeder in a single layer since the dimensions of the stones may vary by as much as a factor of 4 or 5. Thus, in order to feed the larger stones freely, an opening must be provided which it at least five times as large as the smallest stones to be fed. The manner in which the feeder discharges the material in a single layer may be best appreciated by considering the motion imparted to the feeder by the vibrator unit 46.

Referring now to FIG. 1, the line L has been drawn to pass through the shaft 50 of the vibrator unit and the center of gravity C.G. of the suspended portion of the feeder assembly. Considering the suspended portion of the assembly as a free body, rotation of the counterweights 54 exerts forces upon the suspended assembly which may be resolved at any instant into a first component acting along the line L and a second component acting along a line lying in the plane of FIG. 1 and perpendicular to the line L. It is believed apparent that the first component of force acting along the line L acts to move the suspended "free" body only in a motion of translation along L since this component is applied directly through the center of gravity.

The second component of force, which acts perpendicular to the line L, does not pass through the center of gravity and thus induces not only a translatory movement of the "free" body in a direction perpendicular to L, but also induces angular movement of the free body about the center of gravity. Also, there will be some point, called the instantaneous center of rotation, at which the velocity due to the translation will be equal and opposite to the velocity due to the angular movement. That is, at the instantaneous center of rotation the velocity of the body is zero and, therefore, the motion of the body may be considered as purely rotational about this center.

The location of the center of rotation is determined by the location of the center of gravity of the free body and the location of the point at which the second component of force is applied to the body. For a given fixed center of gravity and a fixed point of force application the center of rotation is fixed relative to the body. The center will always be located on the line L at a point on the opposite side of the center of gravity from the point of force application, since the sum of the velocity due to translation and the velocity due to rotation can vanish only at such a location. Accordingly, as the center of gravity is shifted by changing the weights 64, the instantaneous center of rotation will be moved to another location along a new line L passing through the point of force application and the new center of gravity. Considering the deck load to be a part of the mass of the feeder, changes in the deck load will affect the instantaneous center of rotatiton only insofar as they change the center of gravity. Generally, however, variations in the deck load are very small in comparison to the mass of the feeder and therefore have a negligible effect on the center of rotation, so that the latter may be considered to remain fixed under normal deck load variations.

In FIG. 1 the instantaneous center of rotation is shown to be located at a point c on the line L beyond the center of gravity C.G. of the feeder from the shaft 50. This center of rotation c defines the location of a horizontal axis parallel to the shaft 50, about which the suspended parts of the feeder oscillate, in pivotal movement, due to the periodic component of force acting normal to the line L. Superimposed on this oscillatory movement about the center of rotation c is the translatory movement of the feeder along the line L due to the periodic component of force acting along the latter line.

The net effect of the forces applied by the rotating counterweights 54, therefore, is to drive the feeding surface of the feeder in such motion that any given point on the feeding surface follows an elliptical path located in a vertical plane.

An exaggerated sketch of the elliptical paths of selected points a, b and c on the surface 34 is illustrated in FIG. 1 at A, B and C, respectively. It should be borne in mind that in actual practice, the amplitude of the elliptical path is very small, in one particular structure where the distance between the pivot pin 26 and the materials feeding surface was of the order of 3 feet, the major axis of the elliptical paths was approximately .08 inch and the minor axis of the elliptical path was of the order of .05 inch when the motor of the vibrating unit 46 was driven at a speed of approximately 3500 revolutions per minute.

The most effective movement of the feeding surface 34 in feeding material across the surface occurs when the major axis of the elliptical path of a particular point on the feeding surface is inclined both upwardly and in a forward or feeding direction. Due to the inclination of the major axes of the elliptical paths, it can be seen that that portion of the feeding surface which is closest to the discharge end of the feeding surface is most effective in feeding material.

The reverse inclination of the path of movement at point c is counteracted by increasing the inclination of this portion of the feeding surface to introduce an increased gravitational component to work against the tendency to feed in a reverse direction.

Thus, material adjacent the receiving end of the feeding surface is conveyed toward the discharge end rather slowly, but is subjected to an up and down movement which tends to settle the material upon the feeding surface. As the material moves toward the discharge end of the feeder, its speed of movement increases as the material settles into a single layer. Stated another way, the feeder tends to move a more or less constant volume of material past any given point upon the feeding surface within a given time interval.

While I have described but one embodiment of my invention, it will be apparent to those skilled in the art that the specific structure and environment disclosed is capable of variation. Therefore, the foregoing description is to be considered exemplary rather than limiting, and the true scope of my invention is that defined in the following claims.

Having thus described the invention, I claim:

1. In a materials feeder having a given center of gravity, the combination comprising a frame, means for applying a vibrating force to said frame at a point spaced from said center of gravity of said feeder, said force having a component directed perpendicular to the line between said center of gravity and said point of force application tending to cause rotation of said feeder about an instantaneous center of rotation located along said line to one side of said center of gravity, and means defining a materials feeding surface fixed relative to said frame and intersecting said line on the side of said center of gravity opposite from said instantaneous center of rotation.

2. In a materials feeder the combination comprising, a resiliently supported deck assembly having a materials feeding surface substantially freely movable for limited distances in both horizontal and vertical directions, a vibrating unit located below said surface, and mass means located above said deck assembly for providing said feeder with a center of gravity located above the deck assembly, said vibrating unit having means for producing an oscillating component of force directed normal to the line passing through the point at which said force is applied and said center of gravity, said force rotating said materials feeding surface about an instantaneous center of rotation located along said line above said center of gravity.

3. In a materials feeder the combination comprising, a deck assembly having a materials feeding surface, vibrating means for applying a rotating force to said feeder about a horizontal axis positioned below said surface and transversely to the direction in which material is to be fed thereacross, a member extending upwardly from either side of said deck assembly, weight means attached to said members above said materials feeding surface of sufficient mass with respect to the remainder of said feeder to cause the center of gravity of said feeder to be located above said materials feeding surface, and means supporting said feeder for movement in both horizontal and vertical directions, said rotating force producing one component acting along a line through said center of gravity and tending to move said surface in translation therealong, and another component acting normal to said line tending to move said surface in rotation about an instantaneous center of rotation, the resultant of said two components of force causing movement of said surface in a generally elliptical path.

4. The combination as defined in claim 3 further characterized by means for varying the mass of said weight means to adjust the location of the center of gravity of said feeder and thereby alter its conveying characteristics.

5. In a materials feeder the combination comprising, a deck assembly having a materials feeding surface, vibrating means connected to said deck assembly for applying a rotating force thereto about a horizontal axis disposed transversely to the direction in which material is to be fed across said surface, a member extending upwardly from and connected to either side of said deck assembly, a cross piece connected between said members above said materials feeding surface, means for securing varying amounts of weight to said cross piece to adjust the center of gravity of said feeder, and means supporting said feeder for movement in both horizontal and vertical directions.

6. In a materials feeder the combination comprising, a deck assembly having a materials feeding surface inclined downwardly in the direction in which material is to be fed across said surface, vibrating means mounted below said deck assembly including a drive shaft mounted for rotation about an axis transverse to the direction in which material is to be fed across said surface, a motor for driving said shaft, and an eccentrically disposed mass assembly mounted upon said shaft for rotation therewith, a member extending upwardly from and connected to either side of said deck assembly, a cross piece connected between said members above said materials feeding surface, means for securing varying amounts of weight to said cross piece to adjust the center of gravity of said feeder, and means supporting said feeder for movement in both horizontal and vertical directions.

7. In a materials feeder the combination comprising, a deck assembly having a materials feeding surface inclined downwardly in the direction in which material is to be fed across said surface, vibrating means mounted below said deck assembly including a drive shaft mounted for rotation about an axis transverse to the direction in which material is to be fed across said surface, a motor for driving said shaft, and an eccentrically disposed mass assembly mounted upon said shaft for rotation therewith, a member extending upwardly from and connected to either side of said deck assembly, a cross piece connected between said members above said materials feeding surface, means for securing varying amounts of weight to said cross piece to adjust the center of gravity of said feeder, a support, a coupling resiliently mounted upon said support for movement relative thereto, and means connecting the upper ends of said members to said coupling for suspension therefrom.

8. In a materials feeder the combination comprising, a vertically extending frame having two spaced apart side members, means defining a materials feeding surface in the lower part of said frame between said two side members, an eccentric mass vibrator mounted on said frame below said surface for applying a rotating force to said frame along an axis transverse to the direction in which material is to be fed across said surface, a support above said frame, a resilient coupling connected between the upper ends of said side members and said support enabling swinging movement of said frame relative to said support, a spring having one end thereof connected to said frame and extending generally horizontally therefrom, and means for supporting the other end of said spring and for adjustably positioning the same toward or away from said coupling to vary the inclination of said materials feeding surface by swinging said frame relative to said support.

9. The combination as defined in claim 8 further characterized by said frame including a cross member connected between said side members above said materials feeding surface, and means for securing varying amounts of weight to said cross member to alter the conveying characteristics of said feeder.

10. The combination comprising a materials feeding element having a given center of gravity, and means for resiliently suspending said element for limited amounts of substantially free movement in both horizontal and vertical directions, said materials feeding element including means defining an inclined materials feeding surface, a rotary vibrator located below said surface and rigidly connected to said means defining the surface and means other than said means defining a materials feeding surface and said vibrator having a sufficient amount of mass disposed above said materials feeding surface so as to locate said center of gravity above said surface whereby operation of said rotary vibrator will impart forces to said means defining the materials feeding surface tending to rotate said latter means about an axis that is located on the opposite side of said center of gravity from said surface.

11. In a materials feeder the combination comprising, a deck assembly having an inclined materials feeding surface supported for limited amounts of substantially free movement in both horizontal and vertical directions, a rotary vibrating unit mounted below and rigidly connected to said deck assembly, and mass means located above said deck assembly for providing said materials feeder with a center of gravity located above said deck assembly whereby operation of said vibrating unit will impart forces to said deck assembly tending to rotate the latter about an axis that is located on the opposite side of said center of gravity from said materials feeding surface.

References Cited in the file of this patent

UNITED STATES PATENTS

| | | |
|---|---|---|
| 2,100,878 | Shallock | Nov. 30, 1937 |
| 2,465,833 | Barker et al. | Mar. 29, 1949 |
| 2,679,312 | Dean | May 25, 1954 |
| 2,771,179 | Musschoot | Nov. 20, 1956 |